United States Patent
Li

(10) Patent No.: US 7,335,860 B2
(45) Date of Patent: Feb. 26, 2008

(54) MULTIFUNCTIONAL GRIDDLE

(76) Inventor: George T. C. Li, 2533 N. Carson St., Suite #098, Carson City, NV (US) 89706

( * ) Notice: Subject to any disclaimer, the term of this patent is extended or adjusted under 35 U.S.C. 154(b) by 0 days.

(21) Appl. No.: 11/471,270

(22) Filed: Jun. 20, 2006

(65) Prior Publication Data

US 2006/0289451 A1 Dec. 28, 2006

Related U.S. Application Data

(62) Division of application No. 10/934,882, filed on Sep. 7, 2004, now Pat. No. 7,064,298.

(51) Int. Cl.
*H05B 3/68* (2006.01)
*H05B 3/06* (2006.01)
(52) U.S. Cl. .................... 219/450.1; 219/524
(58) Field of Classification Search ............ 219/446.1, 219/448.11, 450.1, 451.1, 447.1, 524, 538; 99/331–340, 372–379
See application file for complete search history.

(56) References Cited

U.S. PATENT DOCUMENTS

| | | | |
|---|---|---|---|
| 2,597,541 A * | 5/1952 | Squires et al. ................ 99/377 |
| 2,843,716 A * | 7/1958 | Del Francia ............. 219/450.1 |
| 2,899,888 A | 8/1959 | Koci ........................... 99/331 |
| 3,217,280 A * | 11/1965 | Norton ........................ 338/268 |
| 3,348,470 A | 10/1967 | Swanson ...................... 99/331 |
| 3,998,145 A | 12/1976 | Maisch ........................ 99/339 |
| 6,555,795 B2 | 4/2003 | Glucksman et al. ..... 219/450.1 |

OTHER PUBLICATIONS

Note: The cited references were previously submitted to the Patent Office in the parent application of this case (ref U.S. Appl. No. 10/934,882), filed Sep. 7, 2004.

* cited by examiner

*Primary Examiner*—Sang Paik
(74) *Attorney, Agent, or Firm*—Clifford F. Rey

(57) ABSTRACT

A multifunctional griddle having hinged top and bottom heating plate assemblies which receive reversible cooking plates or, alternatively, interchangeable cooking plates for cooking different types of foods such as waffles, pancakes, and hot sandwiches. In one embodiment the reversible cooking plates are nested in face-to-face contact with mating top and bottom heating plates to improve heat transfer to the cooking plates. This is accomplished by forming a mating waffle grid in the heating plates for receiving the waffle iron surfaces of the cooking plates in intermeshing engagement. The intermeshing engagement of the cooking plates with the heating plates also reduces the overall vertical height of the appliance providing a slimmer profile. In an alternative embodiment a set of interchangeable cooking plates is provided having a sliding interface with modified heating plates. In this embodiment the cooking plates are conveniently interchanged to vary the cooking configurations of the appliance.

7 Claims, 21 Drawing Sheets

MULTIFUNCTIONAL GRIDDLE

CROSS-REFERENCE TO RELATED APPLICATION

This is a divisional patent application of a parent application, namely, U.S. patent application Ser. No. 10/934,882 filed Sep. 7, 2004, now U.S. Pat. No. 7,064,298, which is entitled Multifunctional Griddle, and claims the benefit thereof under 35 U.S.C. 120.

BACKGROUND OF INVENTION

The present invention relates to home cooking appliances such as waffle irons and portable grills and, more particularly, to a multifunctional griddle for cooking different types of food products by means of reversible or, in the alternative, interchangeable cooking surfaces.

A variety of cooking appliances which permit cooking of different food products by the use of reversible cooking elements are known in the prior art. For example, U.S. Pat. No. 2,899,888 to Koci discloses one such cooking appliance in the form of a combined waffle baker and grill. This particular appliance has two hinged cases. Each case contains a radiant heating element to one side of a cooking grid. Each grid has a flat cooking surface on one side and a waffle cooking surface on the opposite side. To change from one surface to another, each grid is reversed and reinserted into its corresponding case. It has been found that cooking appliances, such as shown in the Koci patent, that use radiant heating of one side of the grid produce uneven heating of the grid and inefficient heat transfer that leads to longer baking times. Temperature control of a baking surface as shown in the Koci patent is obtained by sensing the temperature of separate thermal masses that possess characteristics similar to the cooking grid. This approach does not always provide accurate temperature control of the heating elements. Reversing the grids requires the grids to be removed. This procedure exposes the heating elements, which are subject to damage if contacted. Further, this feature makes it difficult to clean the interior of such cooking appliances.

U.S. Pat. No. 3,998,145 to Maisch discloses a combination grilling and baking apparatus with two hinged parts. Each part carries a cooking element that has different cooking surfaces. The Maisch patent discloses waffle baking and meat grilling surfaces. Each cooking element has a central elongated and transverse sleeve. Each hinge part carries a heating element. When a cooking element is installed the heating element inserts into the sleeve. This apparatus seems to use a conventional bi-metal control for temperature. Like the device shown in the Koci patent, the combination grilling and baking apparatus disclosed in the Maisch patent requires direct handling of the cooking elements and exposure of the heating element when a cooking element is removed for reversal. Further, even with the cooking elements removed, the heating element makes it difficult to clean the remainder of the cooking appliance.

Other examples of electric cooking appliances having reversible cooking surfaces are disclosed in U.S. Pat. No. 6,555,795 to Glucksman et al. and U.S. Pat. No. 3,348,470 to Swanson.

While these devices fulfill their respective, particular objectives and requirements, the aforementioned patents do not disclose the features of the present multifunctional griddle.

SUMMARY OF THE INVENTION

The present multifunctional griddle is a cooking appliance having top and bottom heating plates which receive reversible cooking plates or, alternatively, interchangeable cooking plates for cooking different types of foods such as waffles, pancakes, hot sandwiches, and other food items. The cooking plates are constructed of highly heat conductive materials, which are nested in intermeshing engagement with top and bottom heating plates to provide more efficient heat transfer to the cooking surfaces. The intermeshing engagement of the cooking plates also reduces the vertical dimension between the hinged heating plates providing a slimmer profile for the present appliance.

There has thus been outlined, rather broadly, the important features of the invention in order that the detailed description thereof that follows may be better understood, and in order that the present contribution to the art may be better appreciated. There are additional features of the invention that will be described hereinafter and which will form the subject matter of the claims appended hereto.

Other features and technical advantages of the present invention will become apparent from a study of the following description and the accompanying drawings.

BRIEF DESCRIPTION OF THE DRAWINGS

The novel features of the present invention are set forth in the appended claims.

The invention itself, however, as well as other features and advantages thereof will be best understood by reference to the following detailed description of an illustrative embodiment when read in conjunction with the accompanying figures, wherein.

DETAILED DESCRIPTION OF THE PREFERRED EMBODIMENTS

Figure 1:
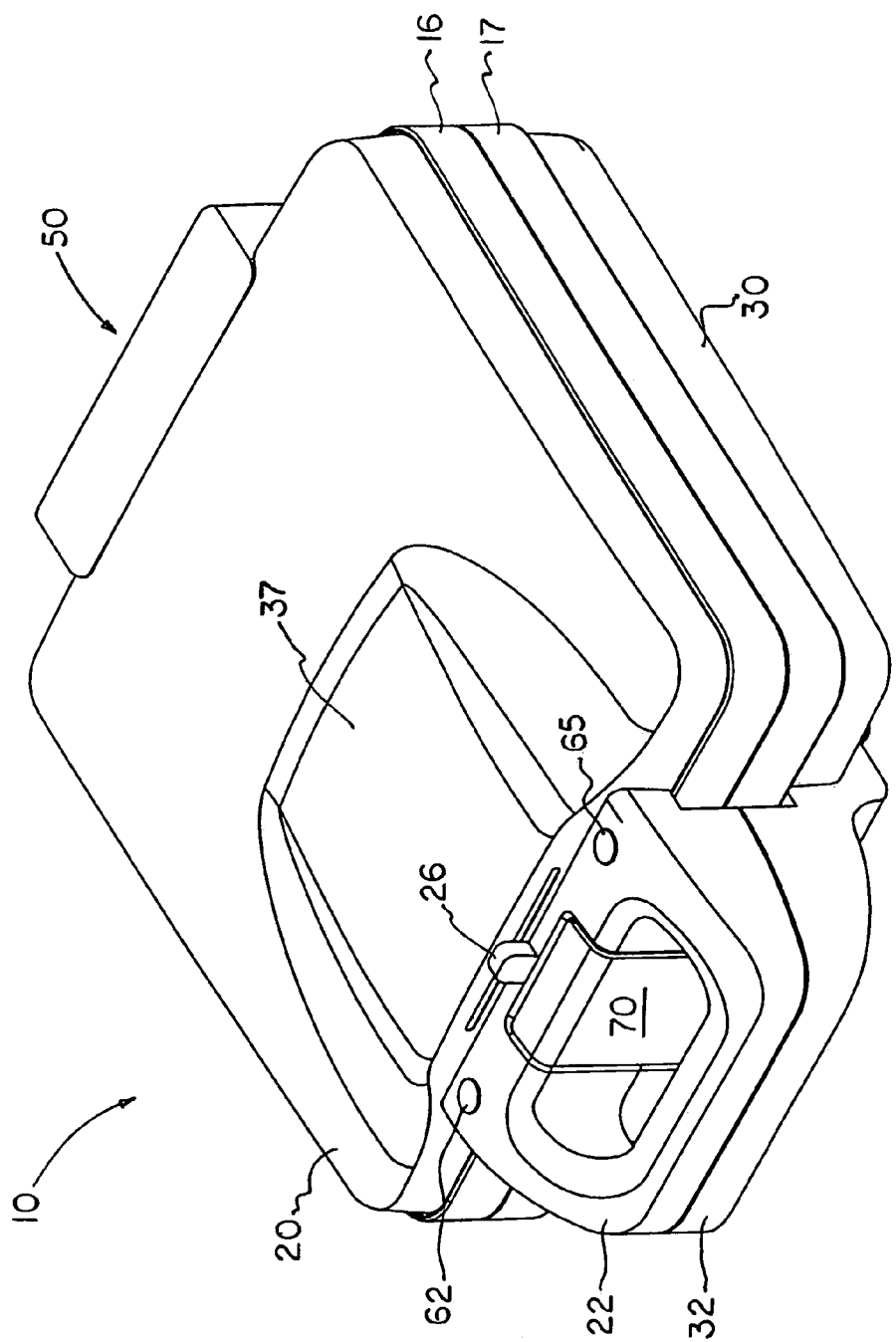
FIG. 1 is a perspective view of one embodiment of the multifunctional griddle of the present invention.
Figure 2:
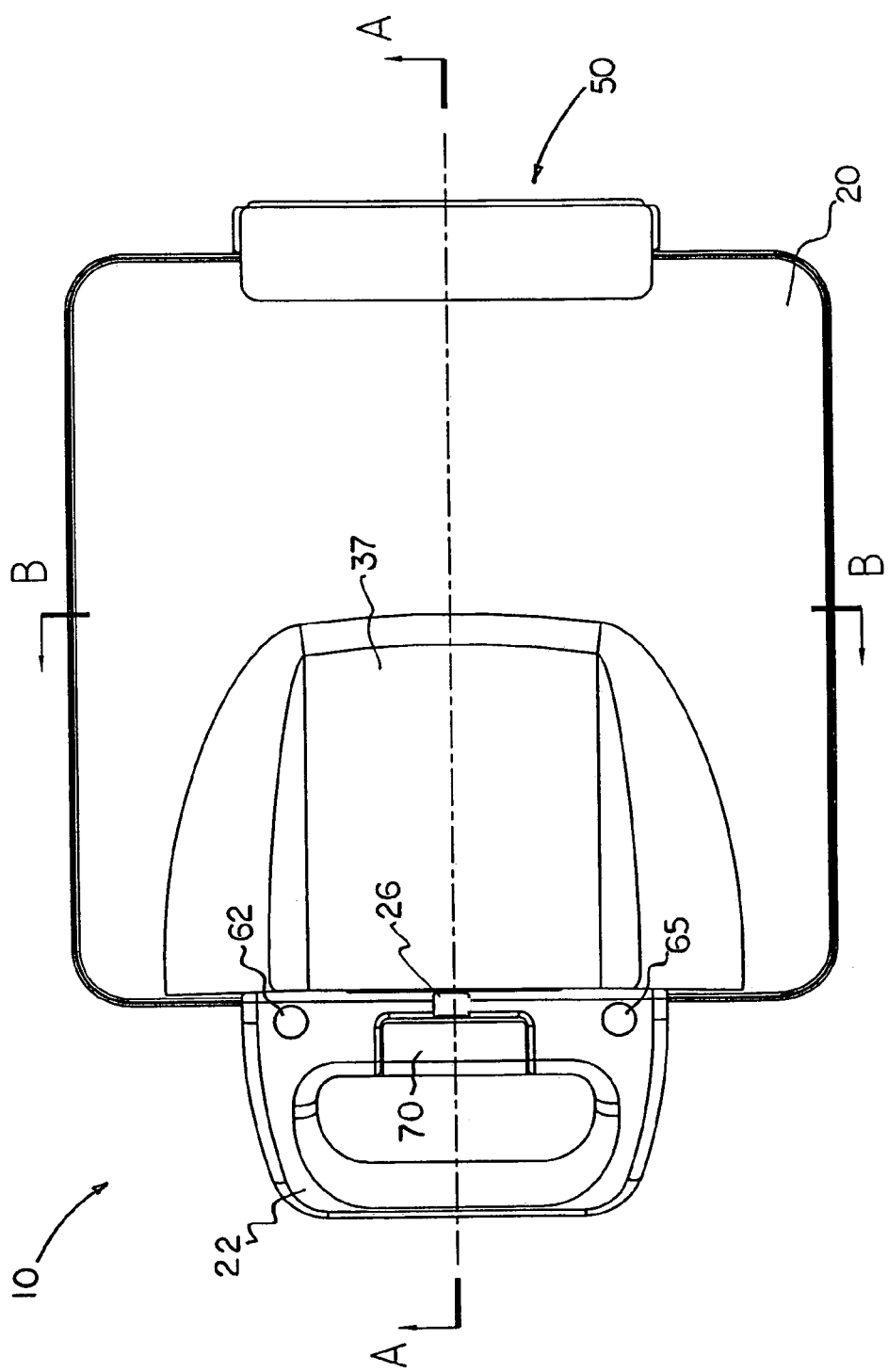
FIG. 2 is a top plan view of the multifunctional griddle of FIG. 1 showing the orientation of section planes A-A and B-B.
Figure 3:
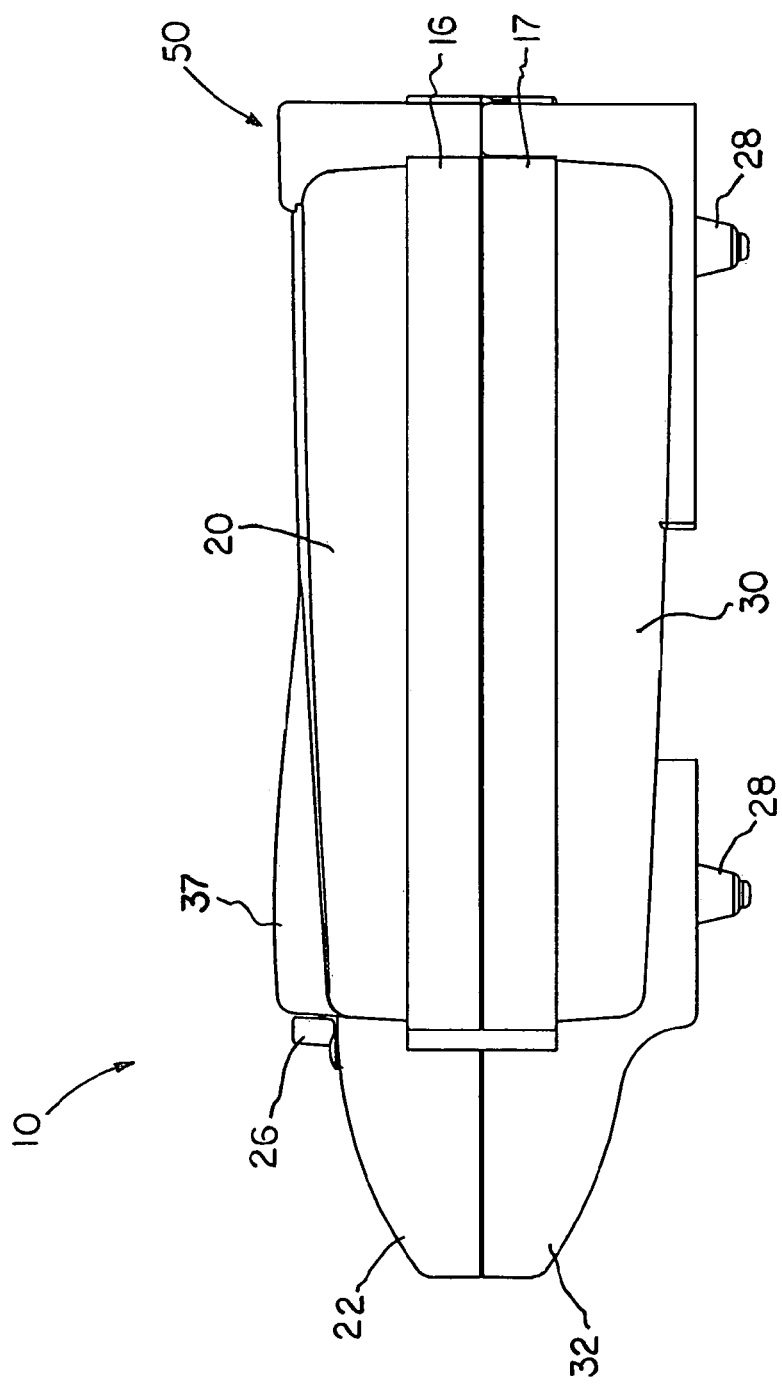
FIG. 3 is a side elevation view of the multifunctional griddle of FIG. 1 in a closed condition.
Figure 4:
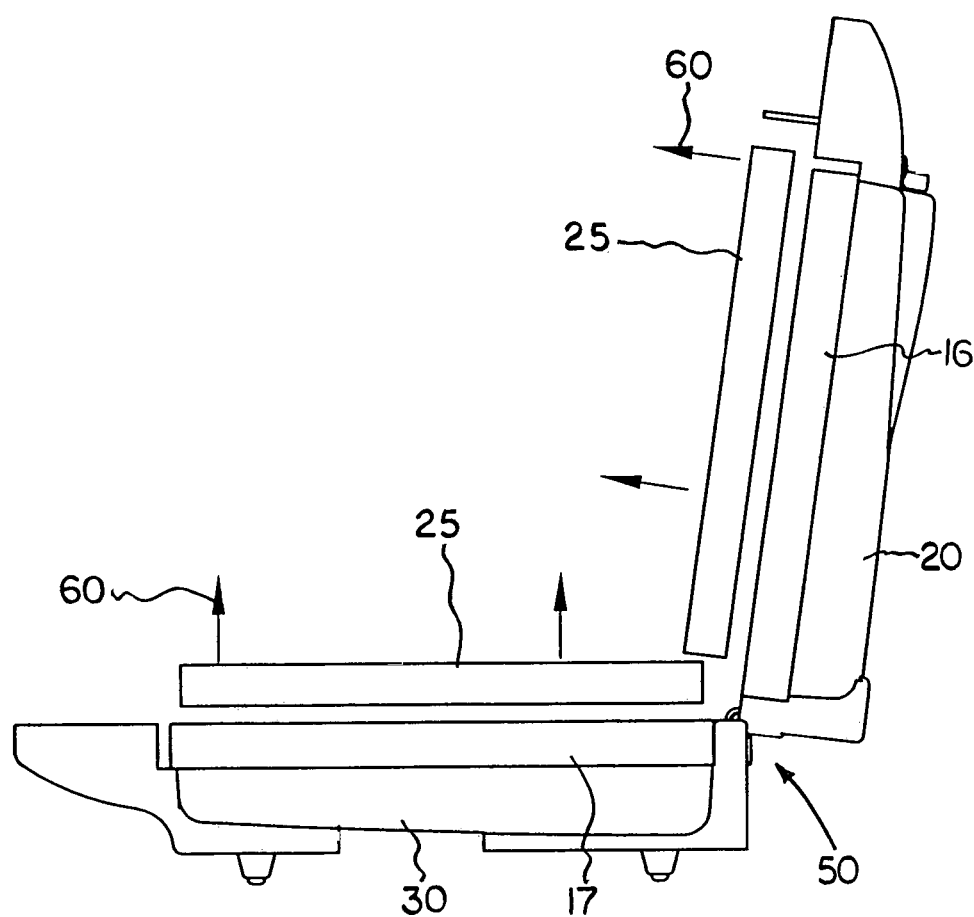
FIG. 4 is a side elevation view of the multifunctional griddle of FIG. 3 in an open condition showing the reversible cooking plates.

With further reference to the drawings there is shown therein a multifunctional griddle in accordance with the present invention, indicated generally at 10 and illustrated in FIG. 1. The present multifunctional griddle 10 includes an upper housing section 20 and a lower housing section 30. The upper housing section 20 and the lower housing section 30 are provided with interconnecting means, including but not limited to, the following structures. In the embodiment shown the upper housing section 20 and the lower housing section 30 are interconnected by a pivoting hinge mechanism, indicated generally at 50 as more clearly shown in FIGS. 2 and 3. Housing frame members 16, 17 extend about the periphery of upper and lower housing sections 20, 30 respectively and function to retain the cooking plates 25 (FIG. 4).

The upper housing section 20 includes a cover 37 that provides access to a temperature controlling means including, but not limited to, the following structures. In the present embodiment a rheostatic temperature controller 35 (FIG. 8) is provided, which is actuated by a sliding control lever 26 as shown in FIG. 1. Alternatively, a completely electronic temperature controller (not shown) may be utilized for the present griddle 10. Since such temperature control devices are well known to those skilled in the art, further detailed discussion of the same is not deemed necessary.

The upper and lower housing sections 20, 30 include upper and lower handles 22 and 32 respectively and are secured in the closed condition shown by latch mechanism 70 (FIG. 1). Detachable feet 28 are also provided to support the present griddle 10 on a countertop or other working surface.

In the preferred embodiment housing sections 20, 30 are constructed of sheet steel, engineered composites, or other heat resistant materials and are provided in different exterior finishes such as heat-resistant paint, powder coating, stainless steel, or plated steel.

In FIG. 4 it can be seen that the multifunctional griddle 10 includes two cooking plates 25 which may be withdrawn from the housing sections 20, 30 by the user (as shown by directional arrows 60) to reverse the cooking surfaces depending on the cooking mode to be utilized.

Figure 5:
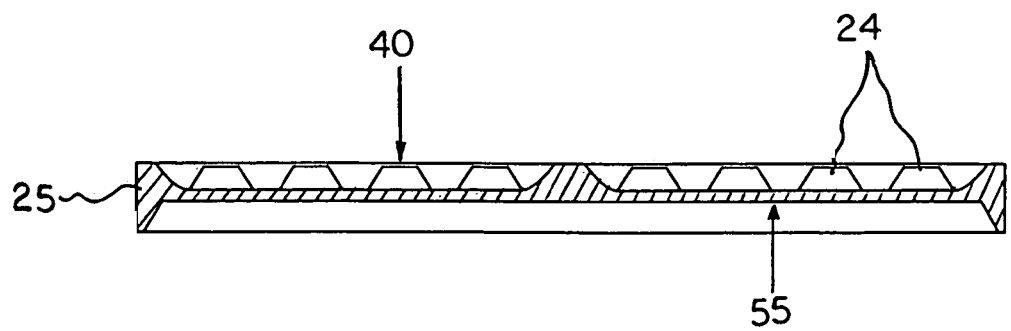
FIG. 5 is a cross-sectional view of the reversible cooking plate of the present embodiment taken along the section plane A-A of FIG. 2.
Figure 6:
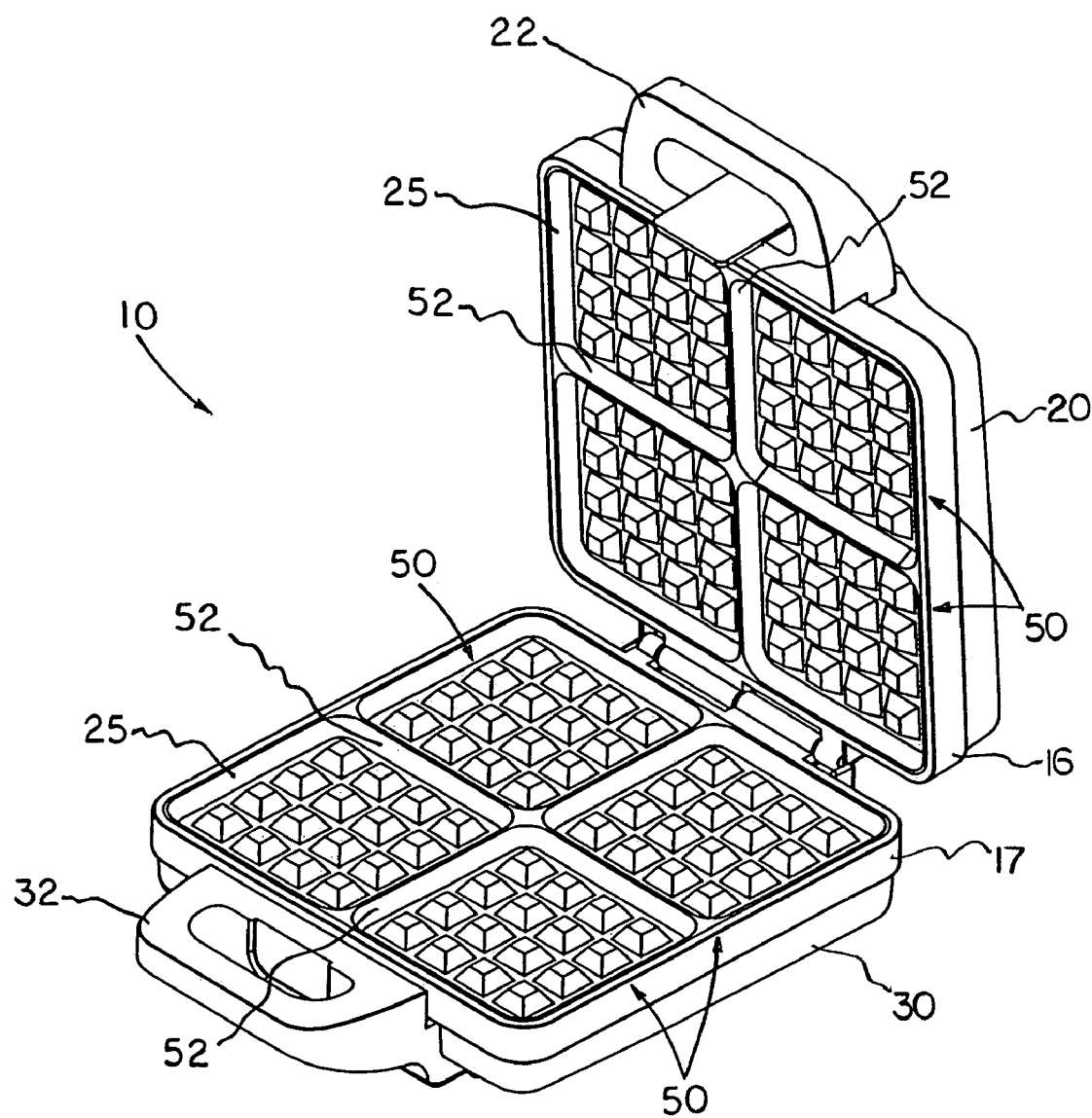
FIG. 6 is a perspective view of the multifunctional griddle of FIG. 1 in a waffle-maker configuration.
Figure 7:
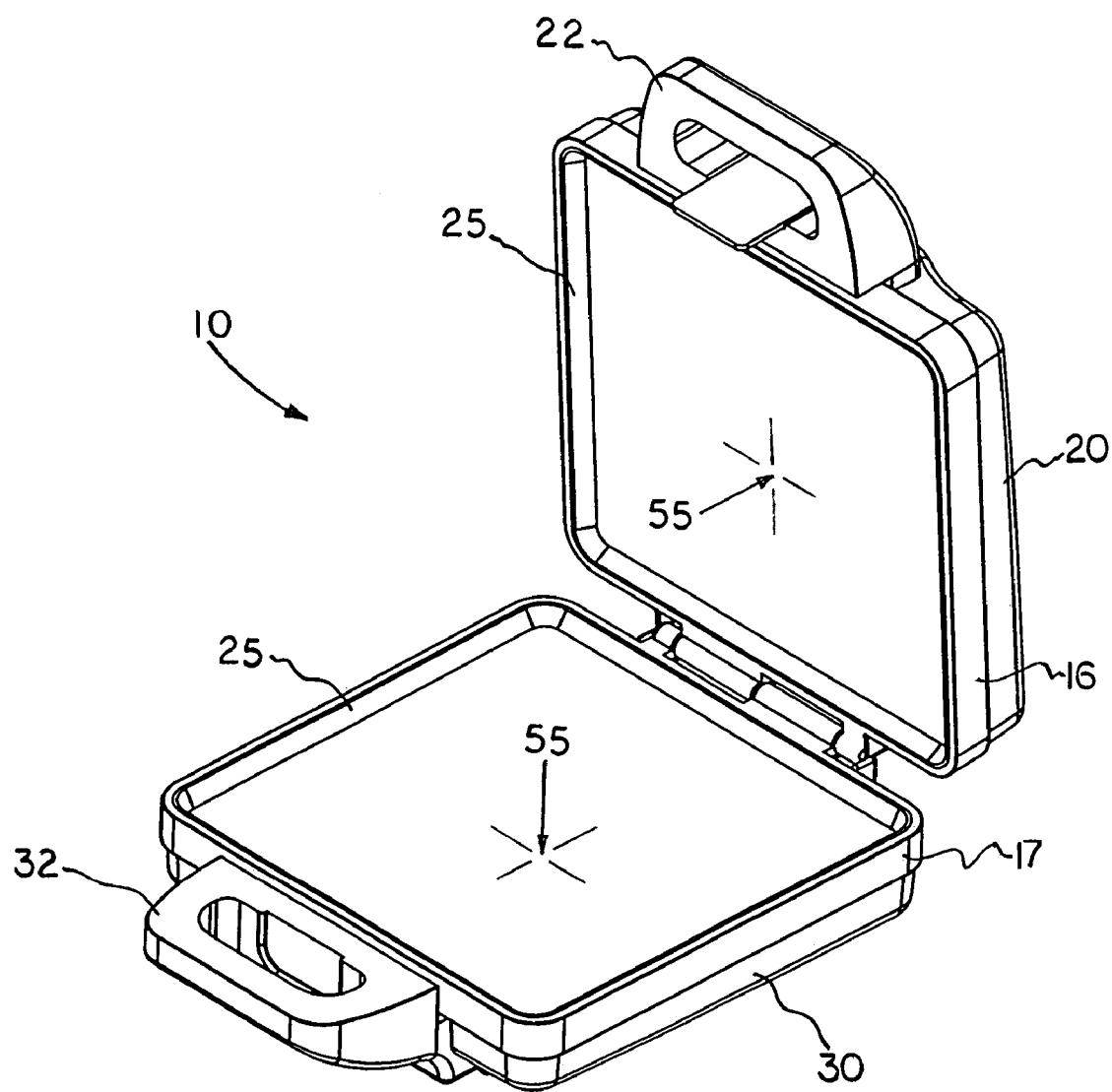
FIG. 7 is a perspective view of the multifunctional griddle of FIG. 1 in a grilling configuration.

In the embodiment seen in FIG. 5, the cooking plates 25, 35 are provided with a waffle iron surface, indicated generally at 40, on a first side thereof and a grilling surface, indicated generally at 55, on a second side, which enables the present griddle 10 to function in the cooking configurations shown in FIGS. 6 and 7 respectively. In the preferred embodiment cooking plates 25 are constructed from cast aluminum, cast iron, steel, or other suitable material having a high coefficient of heat conductivity.

Figure 8:
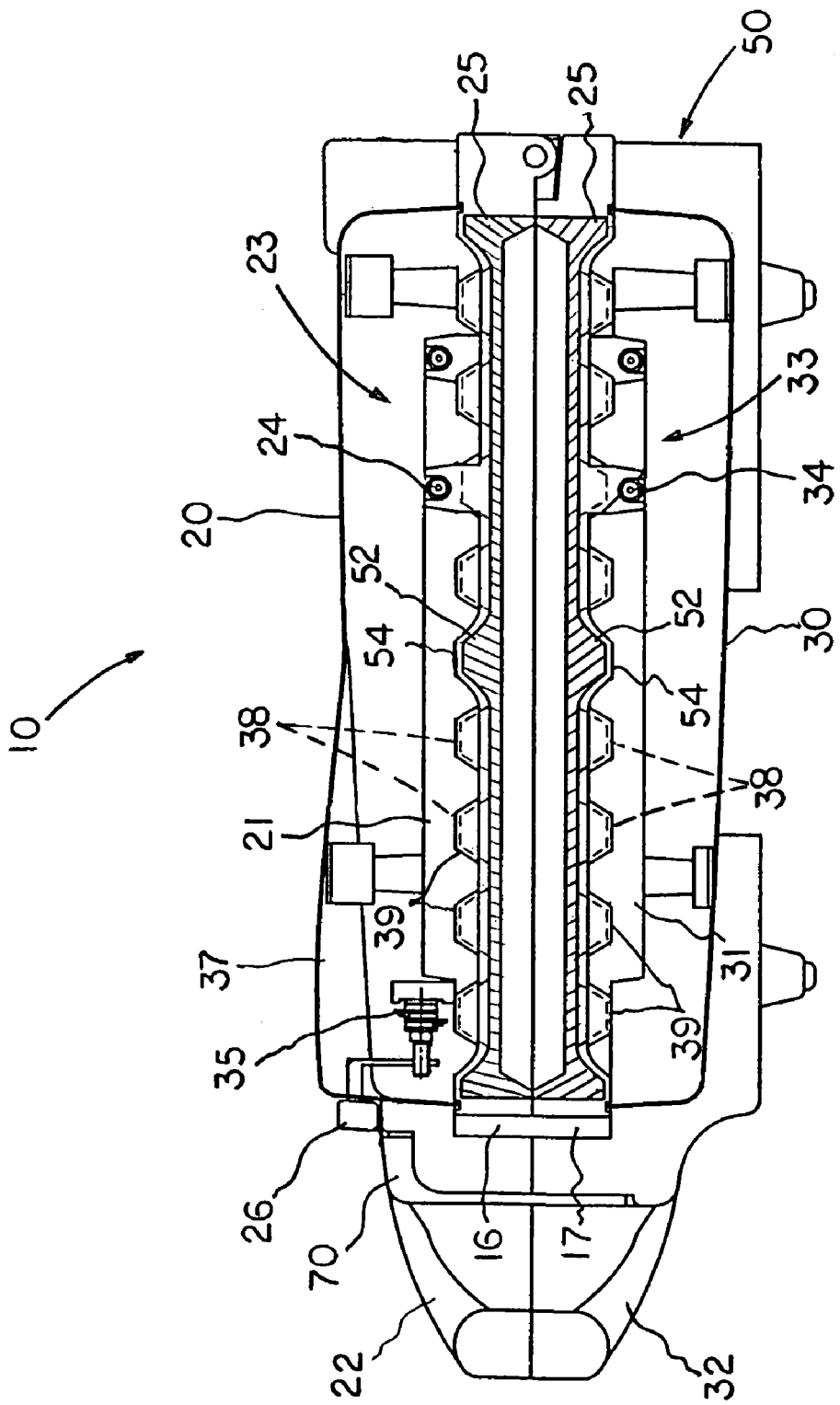
FIG. 8 is a cross-sectional view of the multifunctional griddle taken along section line A-A of FIG. 2 showing the present griddle in the grilling configuration.
Figure 9:
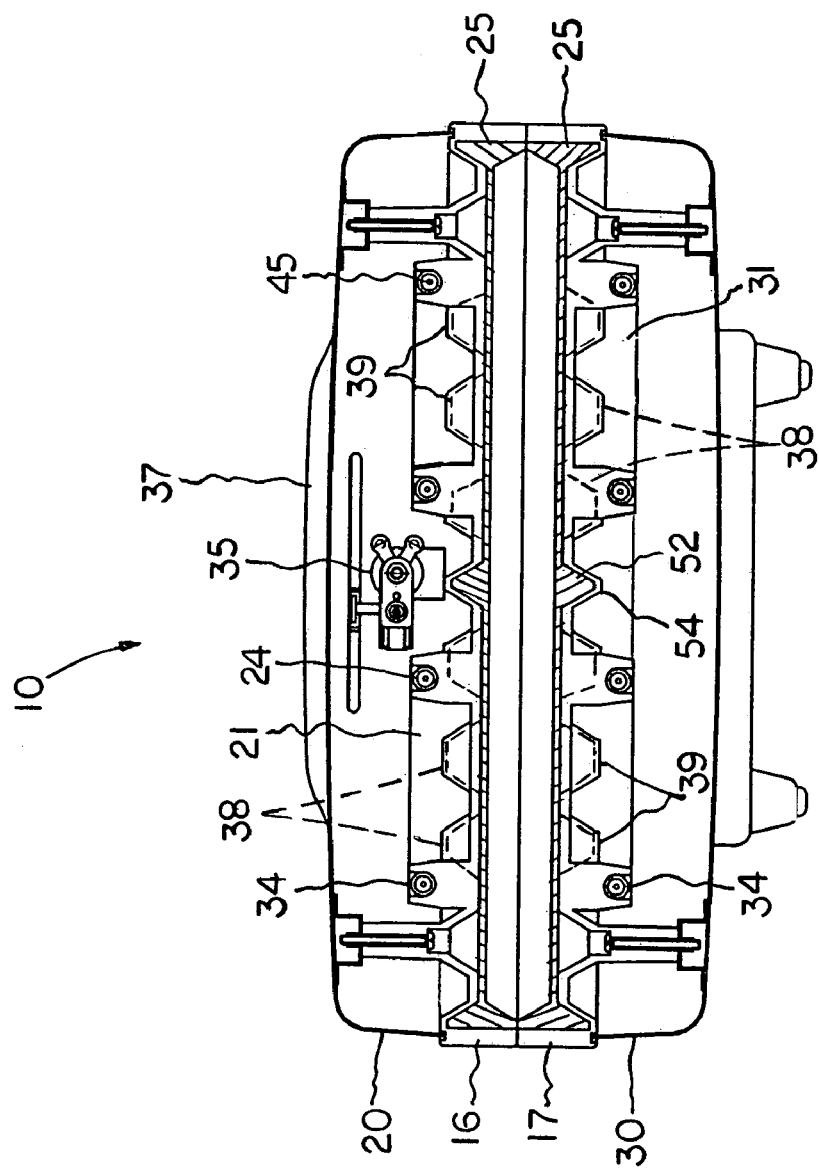
FIG. 9 is a cross-sectional view taken along section line B-B of FIG. 2 showing the present griddle in the grilling configuration.

With reference to FIGS. 8 and 9, the upper and lower housing sections 20, 30 enclose upper and lower heater assemblies, indicated generally at 23 and 33 respectively. Each heater assembly 23, 33 is comprised of a heating plate 21, 31 and a tubular heating element 24, 34 disposed within each heating plate. Heating plates 21, 31 are also constructed from a highly heat conductive material such as cast aluminum, cast iron, steel or other suitable material. In the embodiment shown in FIGS. 8 and 9, heating elements 24, 34 are constructed of stainless steel tubing or other suitable tubing wherein a resistance heater wire 45 is enclosed.

Advantageously, the heating plates 21, 31 are configured to provide a complementary, mating surface for intermeshing engagement with the waffle iron surface 40 of the cooking plates 25 to improve heat transfer therebetween as illustrated in FIGS. 8 and 9. More particularly, it can be seen that the waffle iron surface 40 of each cooking plate 25 is divided into quadrants or waffle grids, indicated generally at 50, by perpendicular cross-bars 52 (FIG. 6), which extend transversely across the cooking plates. Waffle grids 50 are comprised of a plurality of trapezoid-shaped protuberances 38 arranged in parallel rows and columns in a grid pattern.

Similarly, the inwardly facing, opposed surfaces of heating plates 21, 31 shown in FIGS. 8 and 9 are divided into matching quadrants separated by perpendicular grooves 54. The surfaces of heating plates 21, 31 are comprised of similar trapezoid-shaped depressions 39 arranged in parallel rows and columns in a mating grid pattern. When the present invention is configured for use as a grill (FIG. 7), the waffle iron surface 40 of each cooking plate 25 (depicted in hidden lines FIGS. 8 and 9) is nested into its mating heating plate 21, 31. In this configuration the mating protuberances 38 of each cooking plate 25 are disposed in intermeshing engagement with the depressions 39 of each heating plate 21, 31 providing direct contact therebetween for improved heat transfer to the cooking plates 25.

Figure 10:
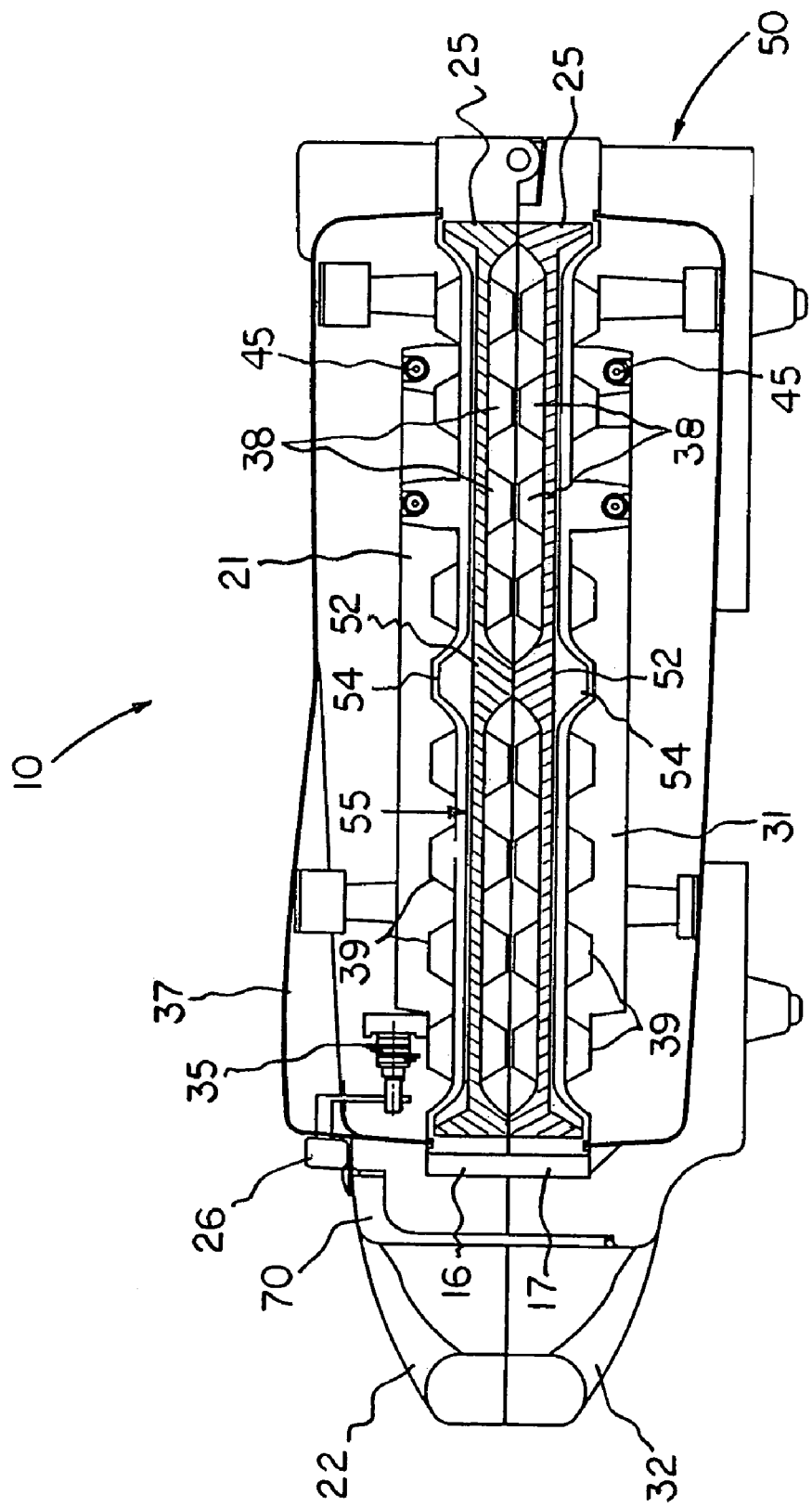
FIG. 10 is a cross-sectional view taken along section line A-A of FIG. 2 showing the present griddle in the waffle-maker configuration.
Figure 11:
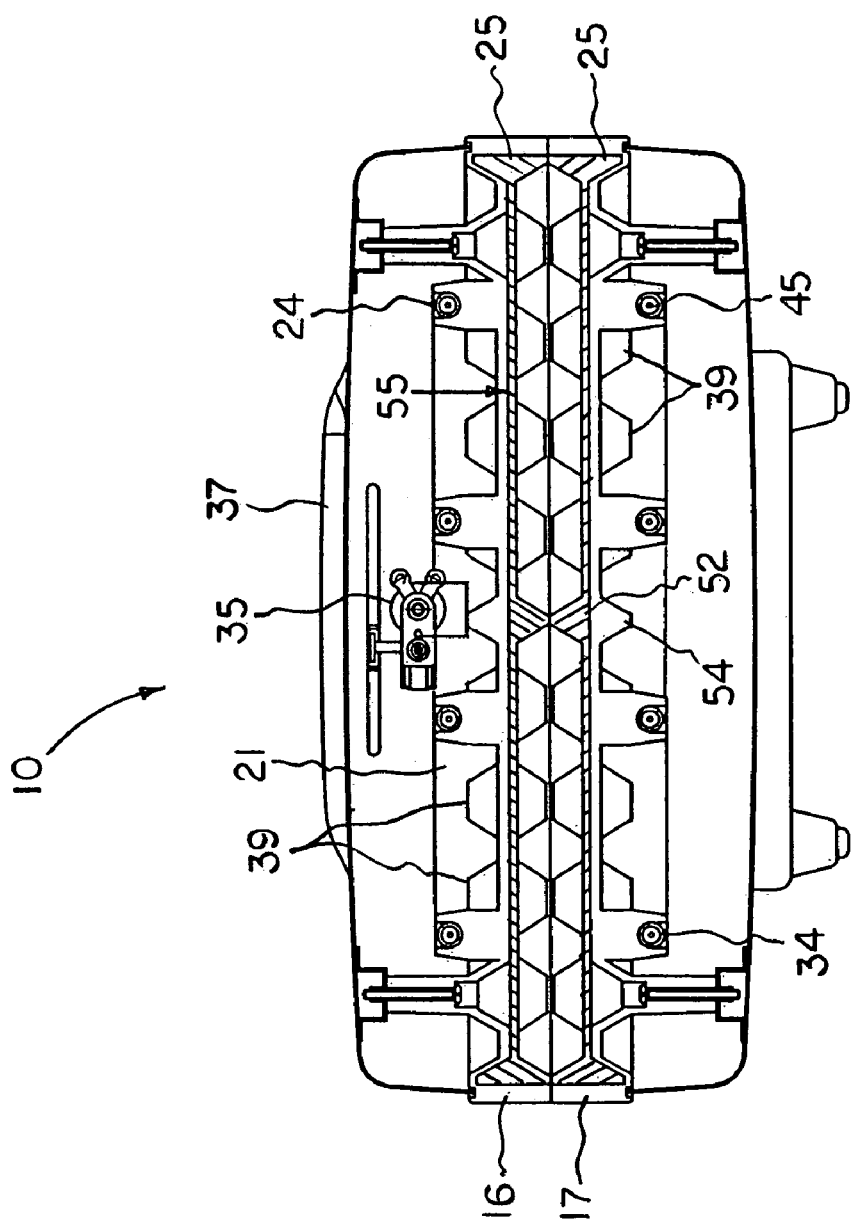
FIG. 11 is a cross-sectional taken along section line B-B of FIG. 2 showing the present griddle in the waffle-maker configuration.

When the cooking plates 25 are reversed in configuration as shown in FIGS. 10 and 11 such that the present griddle 10 functions as a waffle-maker (FIG. 6), the grilling surface 55 of each cooking plate 25 is disposed in face-to-face relation in contact with its corresponding heating plate 21, 31 providing for maximum heat transfer to the cooking plates.

Figure 12:
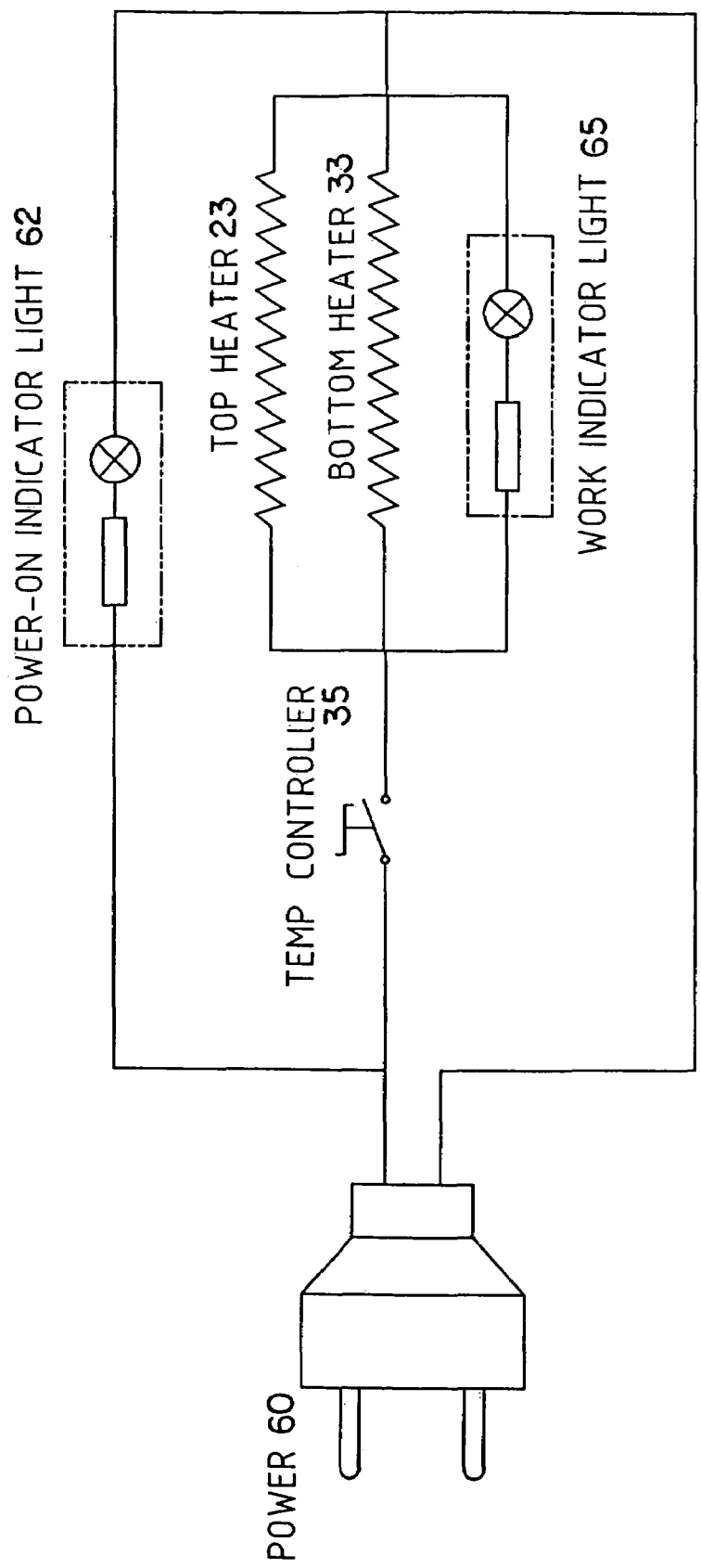
FIG. 12 is an electrical schematic showing the components and circuitry of the present griddle.

Referring to FIG. 12 there is shown an electrical schematic of the present griddle 10 illustrating the components and circuitry thereof. In the embodiment shown the top and bottom heating elements 24, 34 are arranged in parallel electrical circuits interconnected with the temperature controller 35 and a standard 110 volt power source 75 for residential use. The circuitry also includes a Power-ON indicator light 62 and a Work indicator light 65 showing that the heating elements 24, 34 are activated.

Figure 13:
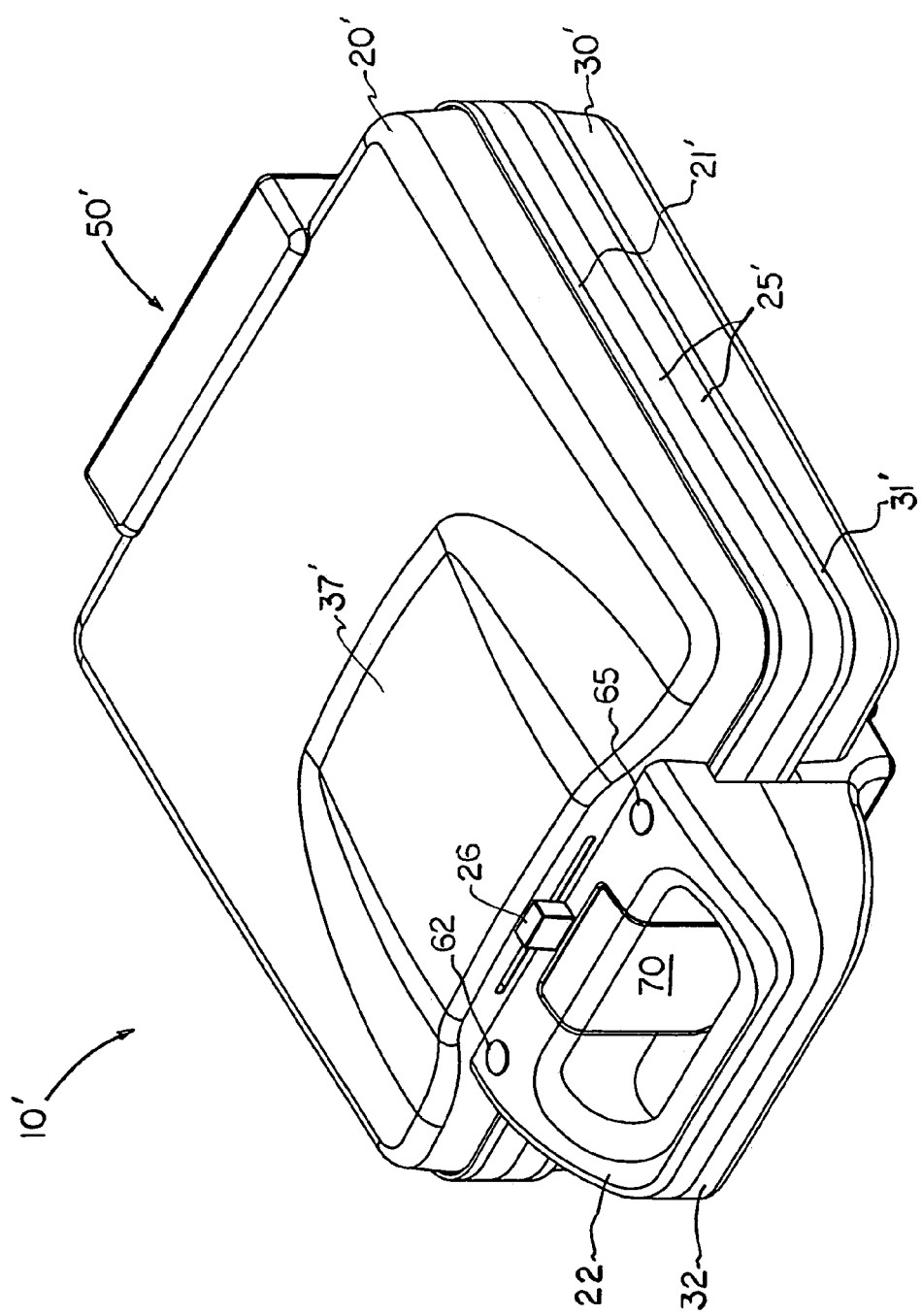
FIG. 13 is a perspective view of another embodiment of the multifunctional griddle of the present invention.
Figure 14:
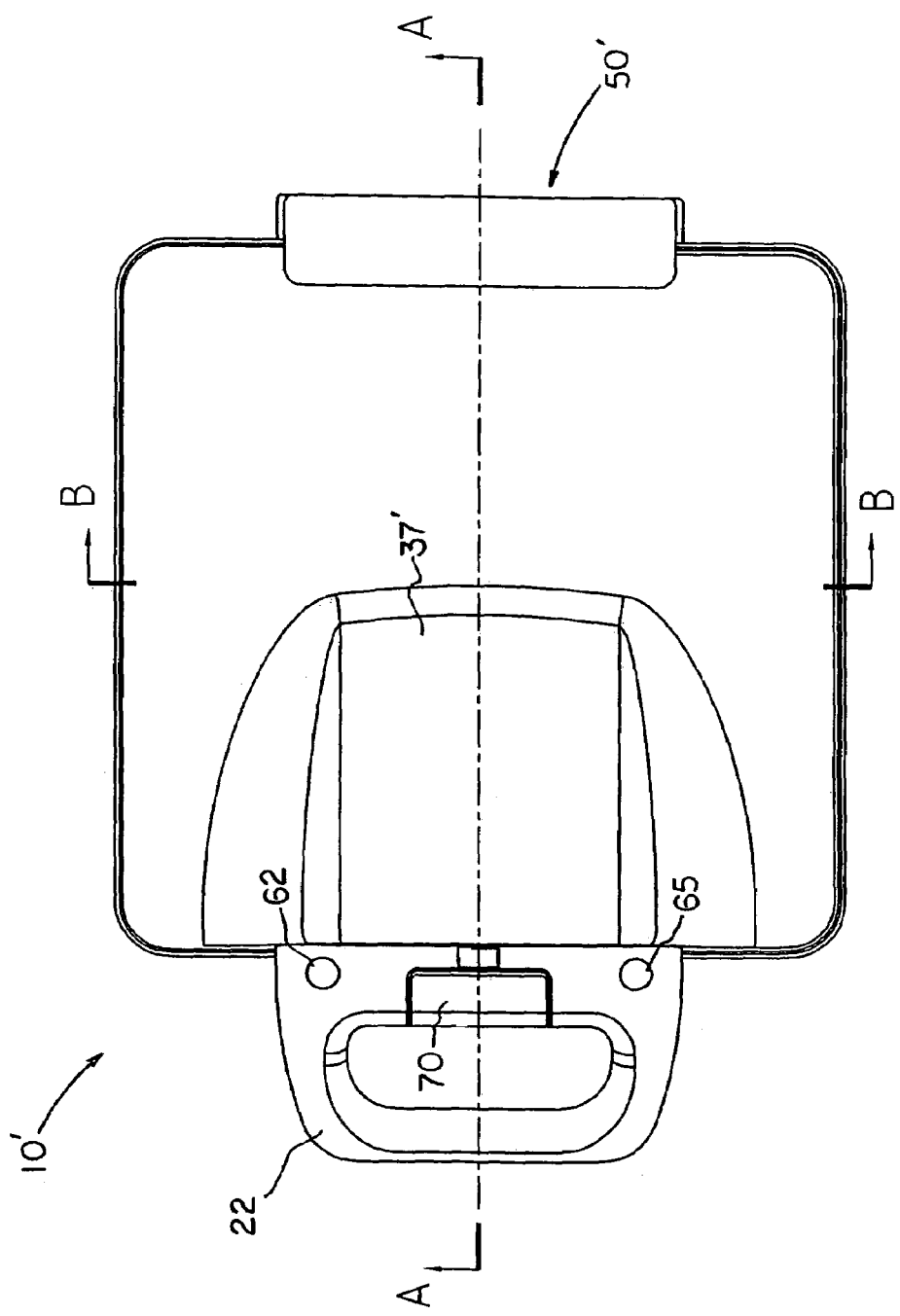
FIG. 14 is a top plan view of the present griddle of FIG. 13 showing the orientation of section planes A-A and B-B.
Figure 15:
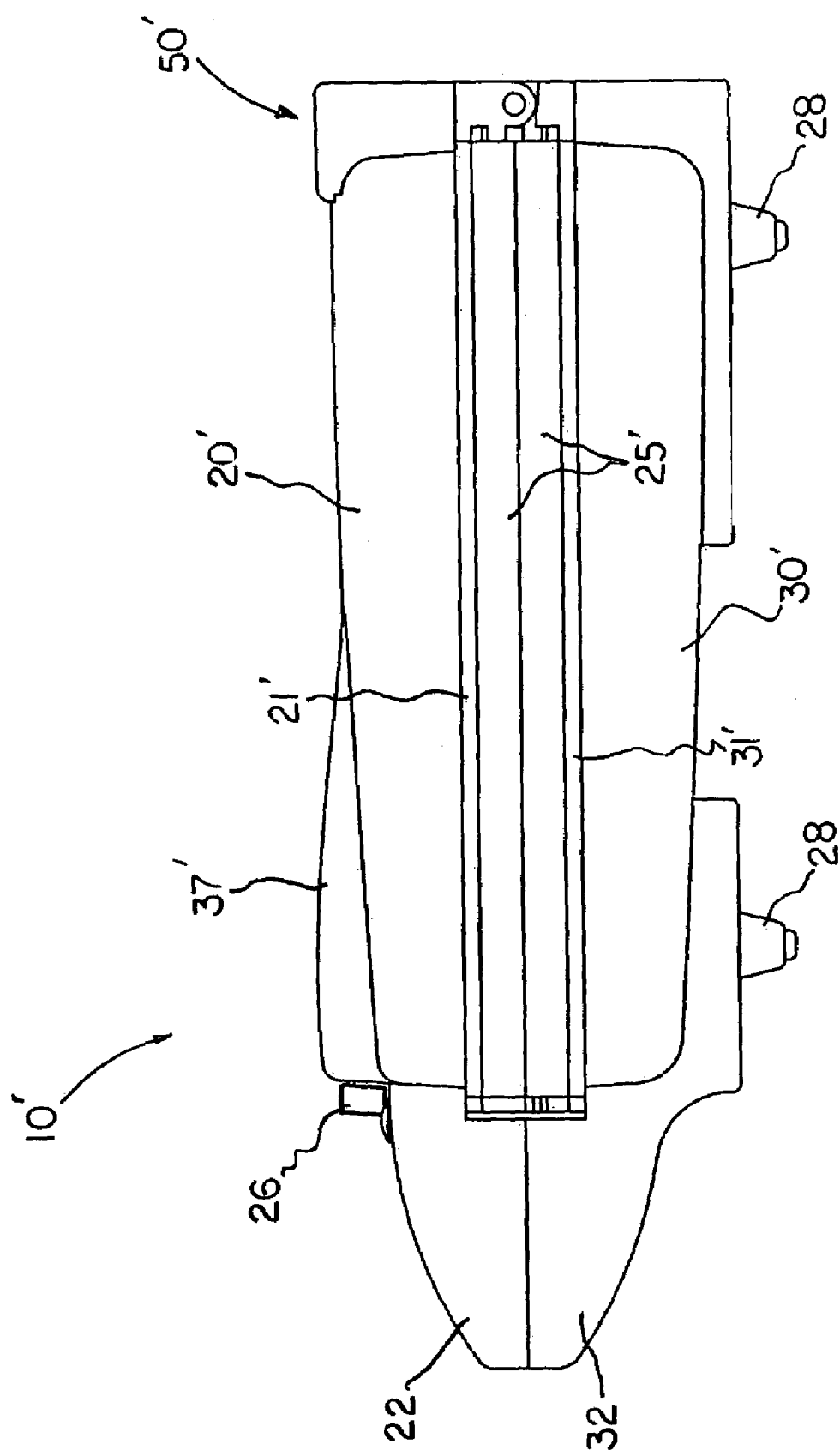
FIG. 15 is a side elevation view of the present griddle of FIG. 13 in a closed condition.

Referring now to FIG. 13 there is shown another embodiment of the present multifunctional griddle, indicated generally at 10'. In this embodiment the griddle 10' includes an upper housing section 20' and a lower housing section 30', which are interconnected by a modified hinge assembly, indicated generally at 50', as more clearly shown in FIGS. 14 and 15.

In this embodiment the housing frame members 16, 17 of the previous griddle 10 (FIG. 1) are omitted based on structural modifications disclosed hereinafter in further detail. The upper housing section 20' includes a cover 37' that provides access to a temperature controlling means including, but not limited to, the following structures. In the present embodiment a rheostatic temperature controller 35 (FIG. 13) is provided, which is actuated by a sliding control lever 26. Alternatively, an electronic temperature controller (not shown) may be utilized to operate the present griddle 10'.

The upper and lower housing sections 20', 30' include the same upper and lower handles 22, 32 respectively and are secured in the closed condition shown by latch mechanism 70 (FIG. 13). Detachable feet 28 are also provided to support the present griddle 10' on a countertop or other working surface.

In the preferred embodiment housing sections 20', 30' are also constructed of sheet steel, engineered composites, or other heat resistant materials and are provided in different exterior finishes such as heat-resistant paint, powder coating, stainless steel, or plated steel.

Figure 16:
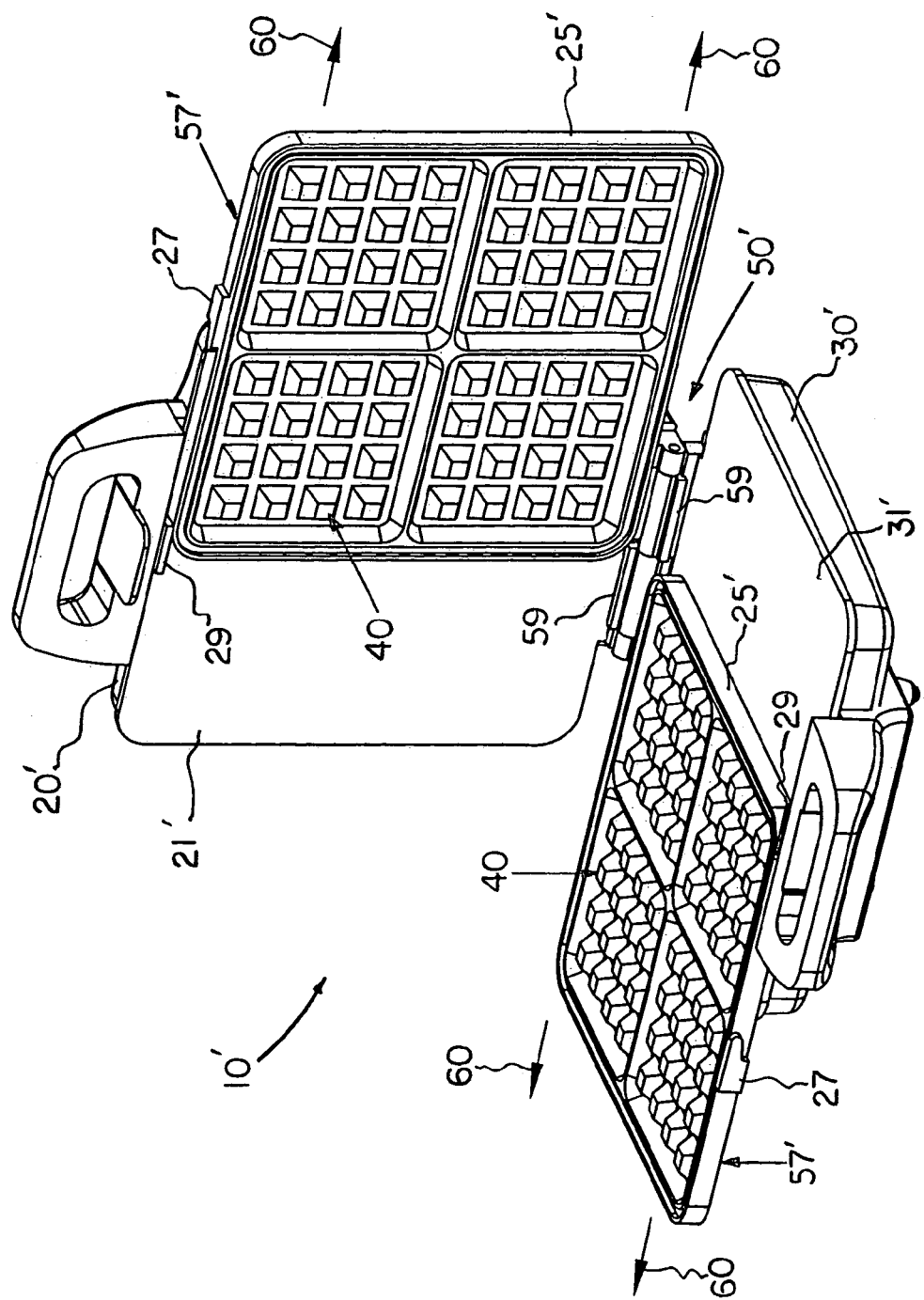
FIG. 16 is a perspective view of the present griddle of FIG. 13 in a waffle-maker configuration.
Figure 17:
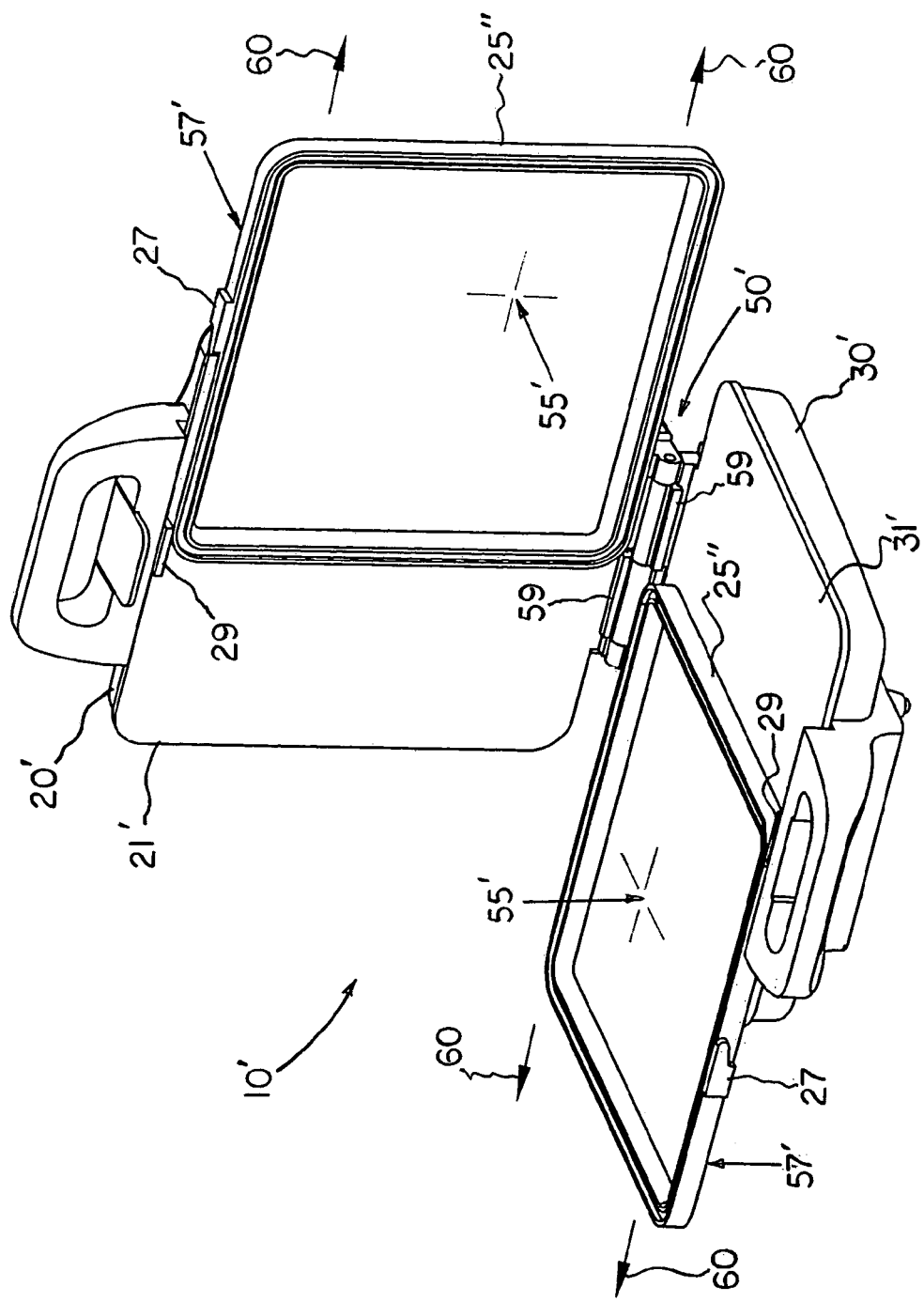
FIG. 17 is a perspective view of the present griddle of FIG. 13 in a grilling configuration.

In FIGS. 16 and 17 it can be seen that griddle 10' includes a plurality of interchangeable cooking plates 25' and 25" respectively, which may be slidingly withdrawn from the housing sections 20', 30' by the user (as shown by directional arrows 60) providing different cooking surfaces depending on the cooking mode to be utilized.

Cooking plates 25', 25" are provided with plate retaining means including, but not limited to, the following structures. In the embodiment shown each cooking plate 25', 25" is provided with an integral clasp 27 formed on the forward edge thereof, which interlocks with a retaining clip 29 positioned adjacent each handle 22, 32 to secure the cooking plates 25', 25" in position during operation. In addition, a retaining ledge 58 (FIG. 18) is formed on the back edge of each heating plate 21', 31' that engages cooking plate retainers 59, which are integrally formed on the opposed half-sections 50a', 50b' of hinge 50'.

In the embodiment shown in FIG. 16, the cooking plates 25' are provided with a waffle iron surface, indicated generally at 40, on a first side thereof and a flat heat transfer surface, indicated generally at 57', on the opposite side. In the embodiment shown in FIG. 17, the cooking plates 25" are provided with a grilling surface, indicated generally at 55', on a first side thereof and a flat heat transfer surface, indicated generally at 57', on the opposite side. The interchangeable cooking plates 25', 25" enable the present griddle 10' to function in the cooking configurations shown in FIGS. 16 and 17 respectively. Cooking plates 25', 25" are constructed from cast aluminum, cast iron, steel, or other suitable material having a high coefficient of heat conductivity.

With reference to FIGS. 18-21, the internal structure of the present griddle 10' is shown in further detail. The upper and lower housing sections 20', 30' enclose upper and lower heater assemblies, indicated generally at 23' and 33' respectively. Each heater assembly 23', 33' is comprised of a heating plate 21', 31' and an integrated heating element 24, 34. Heating plates 21, 31 are also constructed from a highly heat conductive material such as cast aluminum, cast iron, steel or other suitable material. Heating elements 24, 34 are constructed of stainless steel tubing or other suitable tubing wherein a resistance heater wire 45 is enclosed.

In the present griddle 10' it can be seen that heating plates 21', 31' are configured such that the inwardly facing surfaces thereof are flattened to provide a sliding interface as shown by directional arrows 60 (FIGS. 16 and 17) with the flat heat transfer surfaces 57' of cooking plates 25', 25" for convenient interchangeability by the user.

Figure 18:
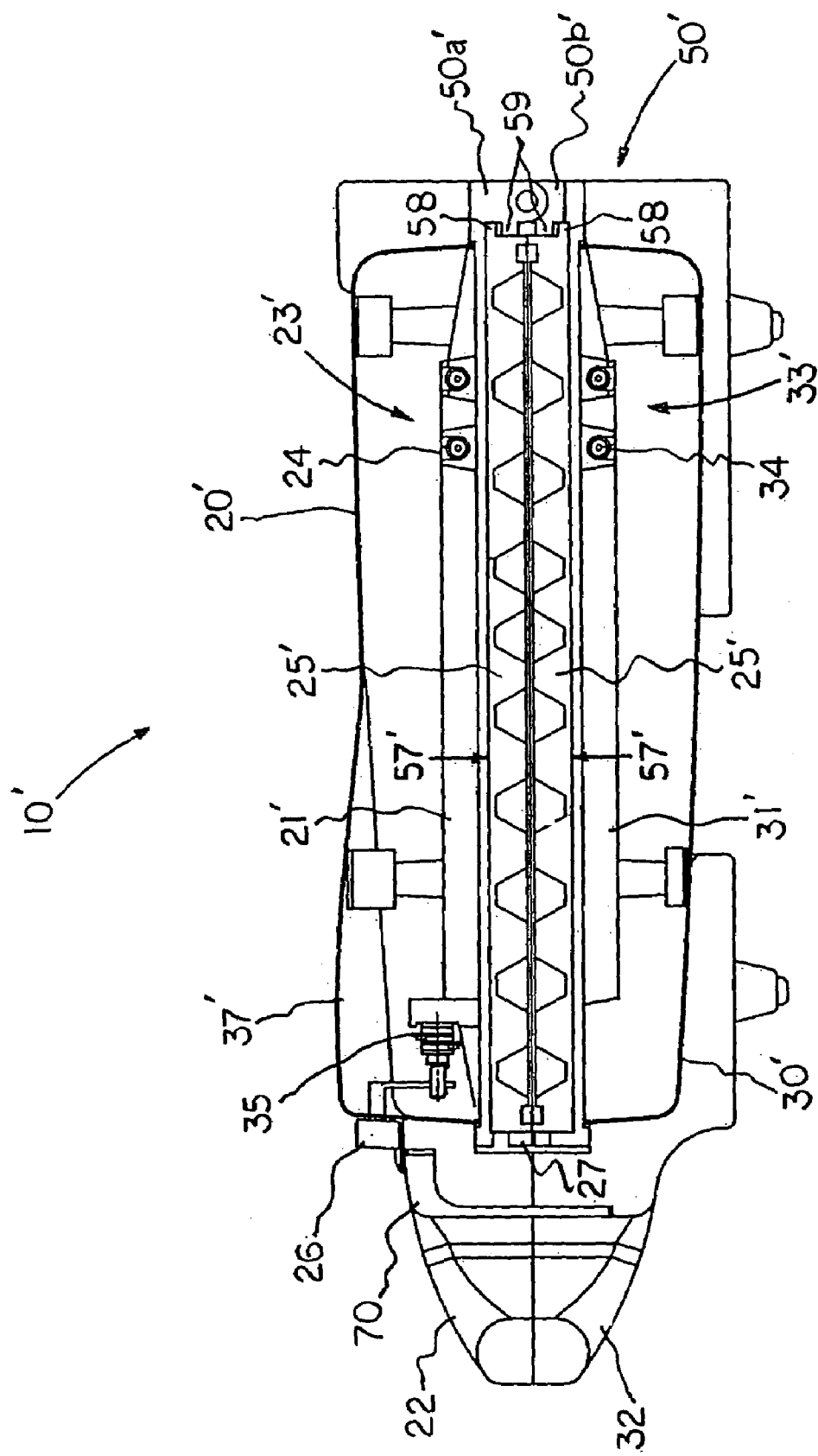
FIG. 18 is a cross-sectional view of the multifunctional griddle taken along section line A-A of FIG. 14 showing the present griddle in a waffle-maker configuration.
Figure 19:
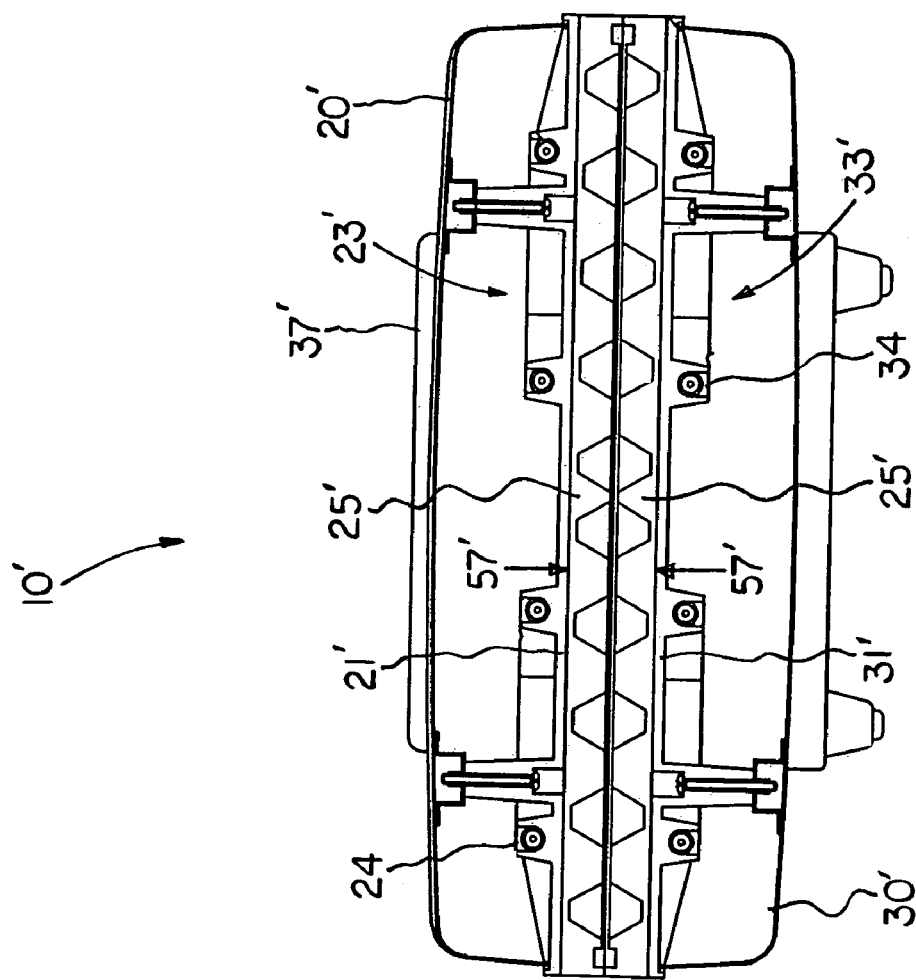
FIG. 19 is a cross-sectional view taken along section line B-B of FIG. 14 showing the present griddle in a waffle-maker configuration.
Figure 20:
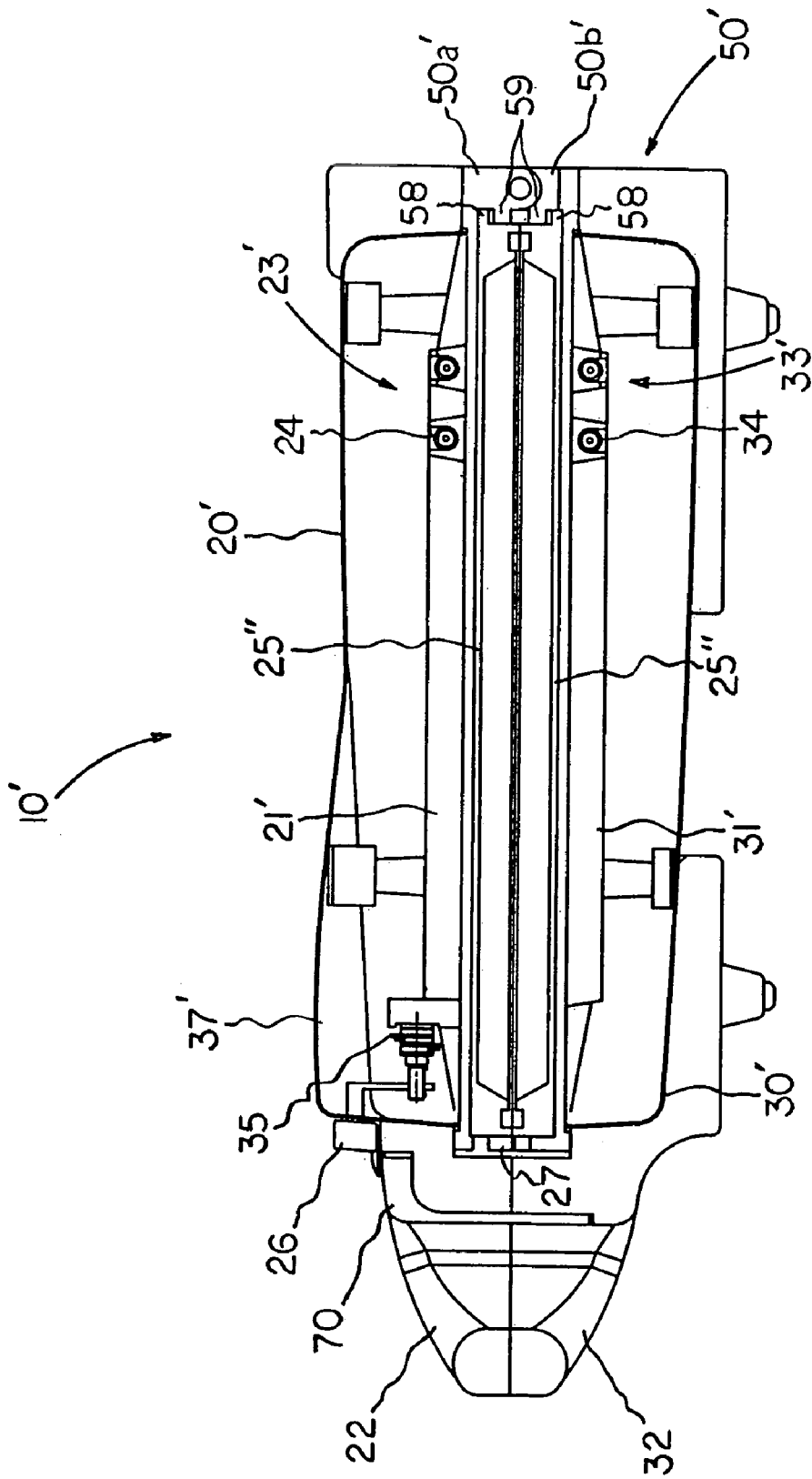
FIG. 20 is a cross-sectional view of the multifunctional griddle taken along section line A-A of FIG. 14 showing the present griddle in a grilling configuration.
Figure 21:
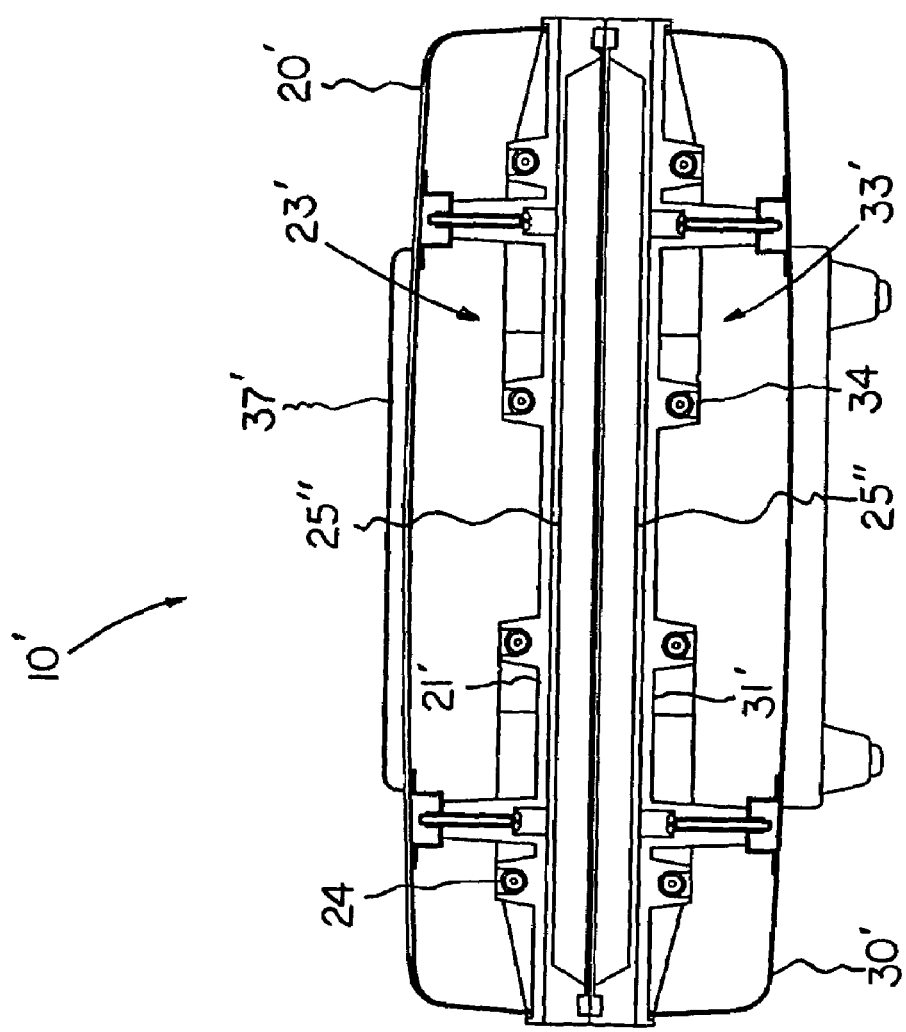
FIG. 21 is a cross-sectional view taken along section line B-B of FIG. 14 showing the present griddle in a grilling configuration.

In the embodiment shown in FIGS. 18 and 19 the griddle 10', cooking plate 25' is installed to provide a waffle-maker configuration. In this arrangement the heat transfer surfaces 57' of cooking plates 25' are disposed in face-to-face contact with heating plates 21', 31' respectively providing for optimum heat exchange therebetween. When the cooking plates 25' and 25" are interchanged as shown in FIGS. 20 and 21 such that the present griddle 10' functions as a pancake grill or sandwich-maker, the heat transfer surfaces 57' of each cooking plate 25" are similarly disposed in face-to-face contact with heating plates 21', 31' providing for efficient heat transfer to the cooking plates.

Figure 22:
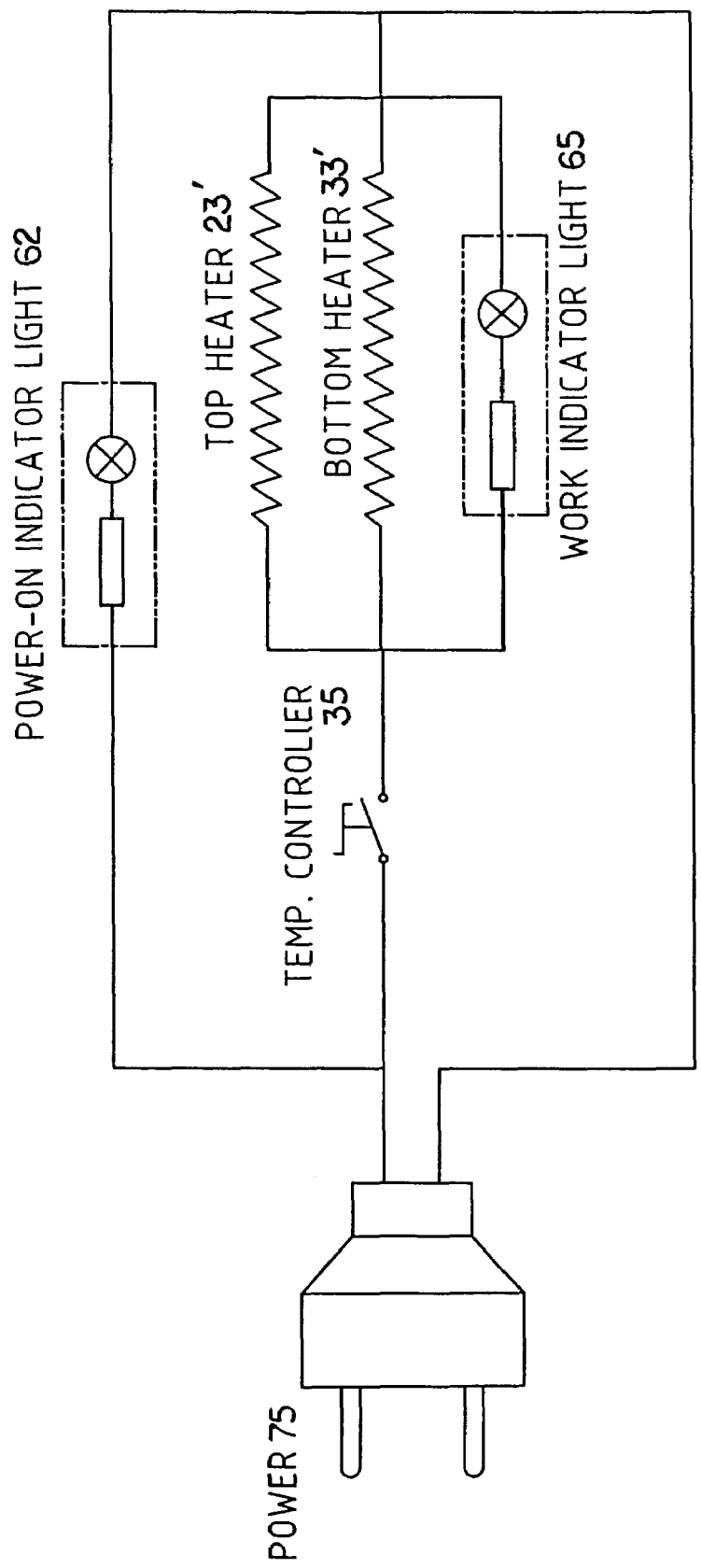
FIG. 22 is an electrical schematic showing the components and circuitry of the present griddle.

Referring to FIG. 22 there is shown an electrical schematic of the griddle 10' illustrating the components and circuitry thereof. As in the previous embodiment (FIG. 12) the top and bottom heating elements 24, 34 are arranged in parallel electrical circuits interconnected with the temperature controller 35 and standard 110 volt power source 75 for residential use. In this embodiment the circuitry also includes a Power-ON indicator light 62 and a Work indicator light 65 showing that the heating elements 24, 34 are activated.

Although not specifically illustrated in the drawings, it should be understood that additional equipment and structural components will be provided as necessary and that all of the components described above are arranged and supported in an appropriate fashion to form a complete and operative multifunctional griddle incorporating features of the present invention.

Moreover, although illustrative embodiments of the invention have been described, a latitude of modification, change, and substitution is intended in the foregoing disclosure, and in certain instances some features of the invention will be employed without a corresponding use of other features. Accordingly, it is appropriate that the appended claims be construed broadly and in a manner consistent with the scope of invention.

What is claimed is:

1. A multifunctional griddle comprising:
    an upper housing section and a lower housing section interconnected by a hinge assembly, wherein said upper and said lower housing sections include upper and lower handles disposed in interlocking engagement;
    an upper heater assembly including a heating plate having an integrated heating element, wherein said upper heating assembly is disposed within said upper housing section, and a lower heater assembly including a heating plate having an integrated heating element disposed within said lower housing section;
    a temperature controlling means electrically interconnected to said upper heater assembly and said lower heater assembly, said temperature controlling means also being electrically connected to a power source; and
    a plurality of interchangeable cooking plates having a cooking surface on a first side thereof and a flat heat transfer surface on a second side thereof, said cooking plates being disposed in face-to-face relation with said upper heater assembly and said lower heater assembly respectively to provide a sliding interface therebetween to facilitate interchangeability of said cooking plates, each of said interchangeable cooking plates including plate retaining means for securing said cooking plates in position, wherein said plate retaining means include an integral clasp formed on a front edge thereof for sliding engagement with a mating clip formed on said upper and lower handles, said clasp interlocking with said clip to retain said cooking plates in position during operation.

2. The multifunctional griddle of claim 1 wherein said plate retaining means further includes a retaining ledge integrally formed along a back edge of said cooking plates for sliding engagement with a mating plate retainer formed on each half-section of said hinge assembly to retain said cooking plates in position during operation.

3. The multifunctional griddle of claim 1 wherein said plurality of interchangeable cooking plates include at least one waffle-iron surface and at least one grilling surface.

4. The multifunctional griddle of claim 3 wherein said heating plates and said cooking plates are fabricated from materials having a high coefficient of heat conductivity.

5. The multifunctional griddle of claim 1 wherein said heating elements are constructed of stainless steel tubing wherein a resistance heater wire is enclosed.

6. The multifunctional griddle of claim 1 wherein said temperature controlling means includes a rheostatic temperature controller.

7. The multifunctional griddle of claim 1 wherein said upper and lower housing sections are fabricated from a heat-resistant material.

* * * * *